United States Patent [19]

Henderson et al.

[11] 4,220,355
[45] Sep. 2, 1980

[54] CAM GUIDE FOR PASSIVE SHOULDER HARNESS

[75] Inventors: Cyril Henderson, Encino; William Hollowell, Pacific Palisades; Albert R. Close, Newhall, all of Calif.

[73] Assignee: American Safety Equipment Corporation, San Fernando, Calif.

[21] Appl. No.: 936,209

[22] Filed: Aug. 24, 1978

[51] Int. Cl.² .............................................. B60R 21/02
[52] U.S. Cl. ..................................... 280/804; 180/270
[58] Field of Search ....................... 280/804, 802, 808; 180/270, 268, 267; 297/469

[56] References Cited

U.S. PATENT DOCUMENTS

| | | | |
|---|---|---|---|
| 3,830,518 | 8/1974 | Silber | 280/804 |
| 3,833,239 | 9/1974 | Coenen | 280/804 |
| 4,056,271 | 11/1977 | Imabuchi et al. | 280/804 |
| 4,072,323 | 2/1978 | Shimokawa et al. | 280/804 |

*Primary Examiner*—David M. Mitchell
*Attorney, Agent, or Firm*—Poms, Smith, Lande & Rose

[57] ABSTRACT

An improvement in automated passive vehicle restraint systems of the type having a power-driven upper torso restraining belt moving between stowed and wearing positions is disclosed. The upper end of the belt is attached to the driven cable by a fastener having a stiffener attached. The fastener is rotated about the longitudinal axis of the cable as the fastener moves between the stowed and wearing positions. As the fastener is rotated, the stiffener maneuvers the belt away from the head and face of an occupant in the seat with which the belt is associated and correctly positions the belt on the occupant's shoulder at the wearing position.

5 Claims, 8 Drawing Figures

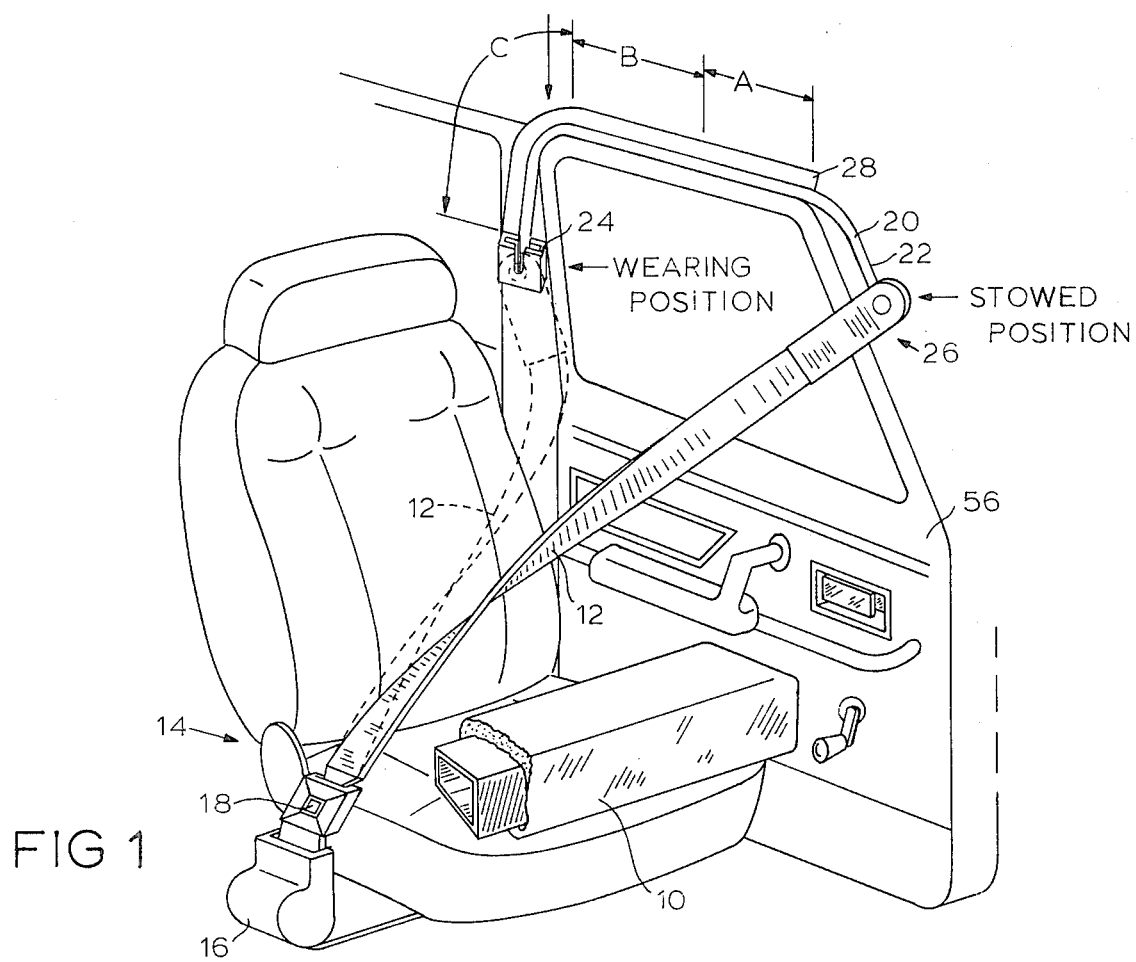
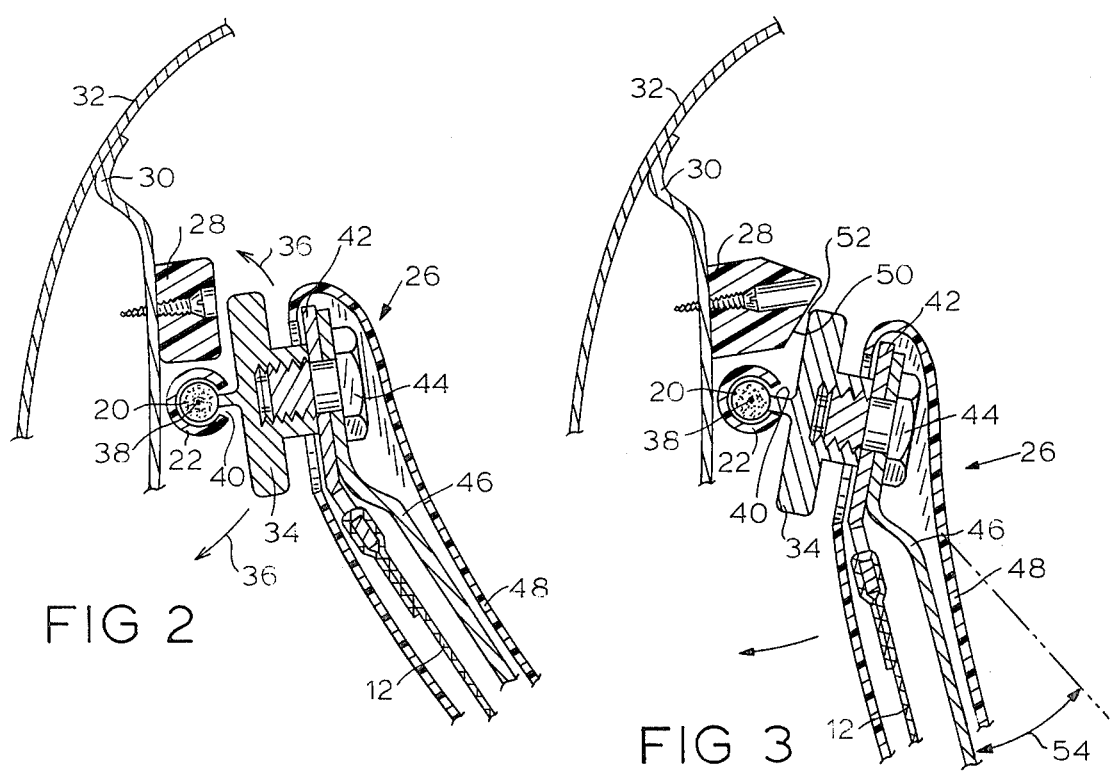

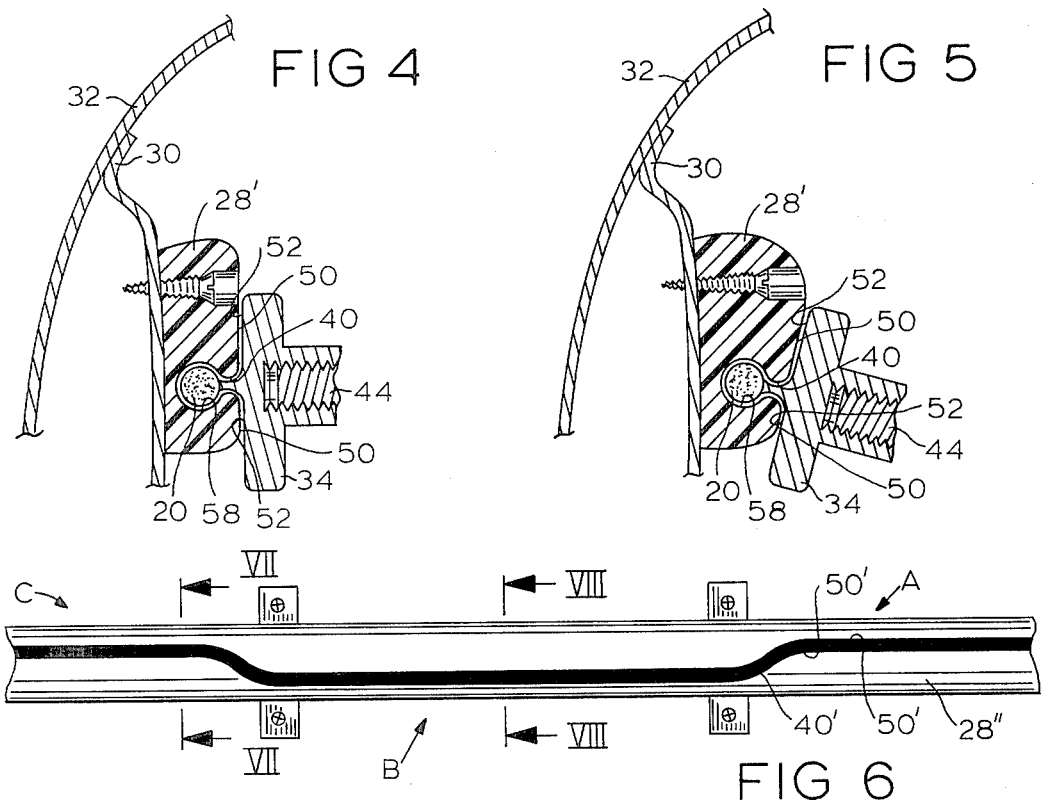
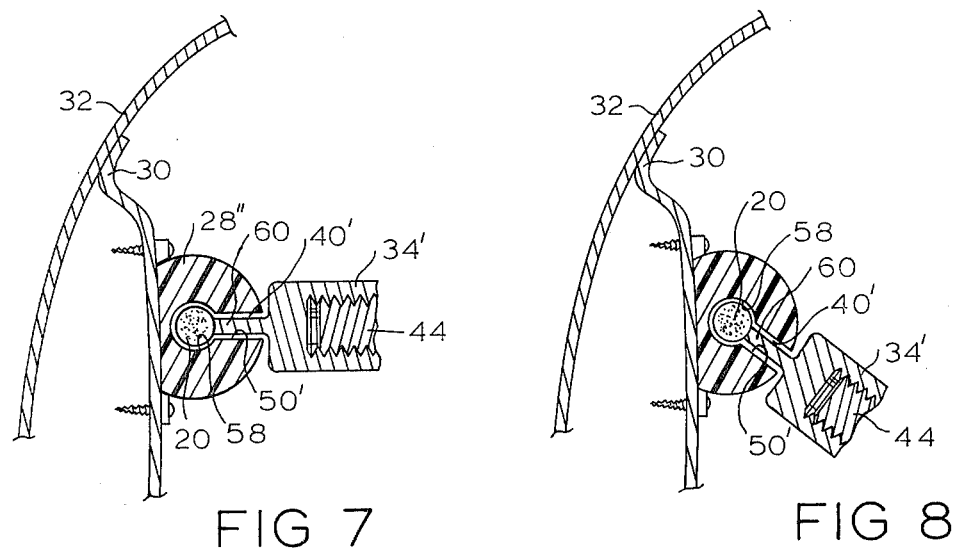

CAM GUIDE FOR PASSIVE SHOULDER HARNESS

BACKGROUND OF THE INVENTION

The present invention relates to vehicle safety systems and, more particularly, to passive vehicle restraint systems incorporating upper torso restraining belts moved between a stowed position and a wearing position by automated equipment.

In a recently devised form of passive restraint system as shown in FIG. 1, a padded knee bar 10 is employed for lower torso restraint and a diagonal torso belt 12 is employed for upper torso restraint. The padded knee bar 10 is positioned in the usual manner in front of the seat 14 wherein an occupant (not shown) sits. The diagonal torso belt 12 is attached on the in-board end adjacent the hip of the occupant by an emergency-locking retractor 16 attached to and moving in combination with seat 14 and incorporating an emergency release buckle 18 therein. The other end of the belt 12 is attached to a cable 20 contained within a guide track 22. The cable 20 is driven by appropriate apparatus (not shown) to move the belt 12 between a stowed position and a wearing position (shown ghosted FIG. 1). For proper positioning of the belt 12, the belt 12 tends to move uncomfortably close to, or strike, the head and face of the occupant in moving between the stowed and the wearing positions.

Wherefore, it is the object of the present invention to provide a means of guiding the belt 12 away from the head and face of the occupant during movement between the stowed and wearing positions while allowing the belt 12 to be correctly positioned for proper operation in the wearing position to afford maximum protection.

SUMMARY

The foregoing objectives have been met in a passive vehicle restraint system having a belt attached on one end adjacent the floor on one side of an occupant and attached on the second end to a driven cable disposed on the opposite side of the occupant for moving the second end between a stowed position forward of the occupant and a wearing position disposed above and behind the occupant to deploy the belt across the upper torso of the occupant by the improvement of the present invention comprising a stiffener attached to the belt adjacent the second end; and, guide means disposed along the path of movement of the second end to contact the stiffener and urge the stiffener to move the belt away from the head of the occupant in moving between the stowed and wearing positions and to urge the belt to the correct position relative to the occupant's shoulder in the wearing position. In the preferred embodiment, the guide means includes a conduit for containing and guiding the driven cable whereby the cable guide track and guide means for rotationally orienting the belt in its path of travel are an integral unit.

DESCRIPTION OF THE DRAWINGS

FIG. 1 is a view of a portion of the interior of an automobile employing a passive vehicle restraint system incorporating the improvement of the present invention.

FIG. 2 is a cut-away section through the roof area of the vehicle of FIG. 1 depicting one embodiment of the present invention in one mode of rotational orientation.

FIG. 3 is a cut-away section through the apparatus of FIG. 2 showing a different rotational orientation of the apparatus.

FIG. 4 is a cut-away section through the roof of the vehicle of FIG. 1 showing the preferred embodiment of the present invention in the same rotational orientation as the apparatus of FIG 2.

FIG. 5 shows the apparatus of FIG. 5 in the same rotational orientation as the apparatus of FIG. 3.

FIG. 6 is an elevation view of an integral track employed in a third embodiment of the present invention having a camming groove longitudinally disposed therein.

FIG. 7 is a cut-away elevation of the roof of a vehicle employing the track of FIG. 6 and in a rotational orientation corresponding to FIGS. 2 and 4.

FIG. 8 shows the apparatus of FIG. 7 in the rotational orientation corresponding to that of FIGS. 3 and 5.

DESCRIPTION OF THE PREFERRED EMBODIMENT

Referring once again to FIG. 1, the present invention is shown as adapted to a tested embodiment of the passive vehicle restraint system generally described previously. As the belt 12 is moved from its stowed position to its wearing position, it passes through position A in front of the occupant, position B moving beside the head of the occupant, and position C wherein it is behind the head of the occupant and moving downward into the belt anchor socket 24 which locks it in operational deployment in the wearing position to restrain the occupant in the event of a sudden stop or accident.

To accomplish the objectives of the present invention, a stiffener, generally indicated as 26, is added to the end of the belt 12 and a cam guide 28 added adjacent to the guide track 22 throughout areas A, B, and C.

Referring now to FIG. 2, the stiffener 26 and cam guide 28 are shown in cross-section as they would appear in areas A and C. As can be seen, the guide track 22 is attached to reinforcement 30 carried by roof panel 32 of the vehicle. The cable 20 is disposed within the guide track 22. A fastening member 34 is attached to the cable 20 for movement in combination therewith. Moreover, fastening member 34 can rotatedas indicated by the arrows 36 about the longitudinal axis 38 of cable 20 within the limitations defined by the longitudinal opening 40 of guide track 22.

The belt anchor 42 is attached to the fastening member 34 with bolt 44. Additionally, a metal stiffening bar 46 is attached to fastening member 34 with the bolt 44 at one end and disposed to lie parallel to belt 12 at the desired angle such that when fastening member 34 is operationally disposed within belt anchor socket 24 belt 12 will be positioned properly across the shoulder of the occupant in seat 14. Belt 12 and metal stiffening bar 46 are enclosed within plastic tubular member 48 which is both decorative and functional. That is, tubular member 48 covers up belt anchor 42, bolt 44, and the end of belt 12 for ornamental purposes. Additionally, it holds belt 12 against stiffening bar 46 so that they move in combination.

Referring now to FIG. 3, the rotational aspects of the present invention are shown. As fastening member 34 moves into zone B adjacent the head of the occupant, cam guide 28 is provided with a camming surface 50 disposed to contact a portion of fastening member 34 as indicated by the point 52 to rotate fastening member 34 and metal stiffening bar 46 in combination therewith through the rotation angle indicated by the arrows 54. Since belt 12 is maintained to move in combination with stiffening bar 46 by tubular member 48, the rotation of stiffening bar 46 causes belt 12 to be urged downward and towards the door 56 away from the head of the occupant as the belt 12 moves through area B. In area C at the belt anchor socket 24 camming surface 50 is preferably configured to rotate belt 12 upward to pass smoothly over the shoulder of the occupant at an optimum angle for both safety and comfort.

While the foregoing embodiment described above shows the present invention as applied to a pre-existing powered passive vehicle restraint system, the preferred embodiment thereof is shown if FIGS. 4 and 5 wherein the functions of cam guide 28 and guide track 22 are combined into a unitary cam guide 28' having an integral longitudinal cable channel 58 disposed therein in which cable 20 is disposed. By so doing, the combined cam guide 28' is aesthetically more pleasing and, additionally, the fastening member 38 is more positively maintained in its rotational orientation die to the increased contact area of the camming surface 50 which, in this embodiment, extends on both sides of the longitudinal opening 40.

Referring now to FIGS. 6 through 8, another embodiment of the present invention is shown. In this embodiment, the cam guide 28" has the caming surface 50' as part of the longitudinal opening 40'. That is, the distance of communication of longitudinal opening 40' between cable channel 58 and the exterior of cam guide 28" is extended and fastening member 34' connected to cable 20 with a guide bar 60 disposed to lie between the sidewalls of the longitudinal opening 40. By orienting the longitudinal opening 40' about the periphery of cam guide 28" as shown in FIG. 6, the sidewalls of longitudinal opening 40 act as the camming surface 50' against the guide bar 60 to rotate and maintain the fastening member 34 and stiffener 26 in combination therewith in the desired rotational orientation.

Wherefore, it will be apparent from the foregoing description of three possible embodiments of the present invention that the present invention has truly accomplished its desired objectives by providing an apparatus for deflecting an upper torso belt moving between stowed and wearing positions away from the head and face of an occupant and into correct position over the occupant's shoulder to prevent any uneasiness or discomfort to be associated with the vehicle restraint apparatus and properly position it for maximum safety.

Having thus described our invention, we claim:

1. In a passive vehicle restraint system having a belt attached on one end adjacent the floor on one side of an occupant and attached on the second end to a driven cable disposed on the opposite side of the occupant for moving the second end between a stowed position forward of the occupant and a wearing position disposed above and behind the occupant to deploy the belt across the upper torso of the occupant, the improvement comprising:

(a) a fastening member attached to the cable for movement in combination therewith and for rotational movement about the longitudinal axis of the cable, the second end of the belt being attached to said fastening member;

(b) a stiffening member attached to said fastening member and disposed adjacent a portion of the belt extending from the point of attachment of the belt to said fastening member, said stiffening member being adapted to rotate the belt about the longitudinal axis of the cable in combination with said fastening member; and, (c) guide means disposed adjacent the cable for contacting said fastening member and moving said fastening member in a pre-established rotational orientation as the second end of the belt is moved between the stowed and wearing positions to maneuver the belt away from the head of the occupant and for urging the belt into the correct orientation relative to the occupant's shoulder in the wearing position.

2. The improvement to a passive vehicle restraint system of claim 1 wherein said stiffening member comprises:

(a) a rigid elongated member attached to said fastening member on one end; and, (b) a tubular member disposed about the belt and said rigid elongated member.

3. The improvement to a passive vehicle restraint system of claim 1 wherein:

said guide means includes an integral channel through which the cable is disposed.

4. The improvement to a passive vehicle restraint system of claim 3 wherein:

(a) said fastening member includes a guide bar disposed radially to the cable being attached to the cable on one end and having the point of attachment of the second end of the belt and said stiffening member adjacent the other end; and, (b) said guide means includes a cam channel defining the path of rotational motion of said fastening member being longitudinally disposed and communicating between said integral channel having the cable therein and the exterior of said guide means, said guide bar being disposed between the sidewalls of said cam channel whereby said fastening member is rotationally moved and maintained in the proper rotational orientation by said cam channel acting on said guide bar as said fastening member is moved between said stowed and wearing positions.

5. The improvement to a passive vehicle restraint system of claim 3 wherein:

(a) said guide means includes a longitudinally disposed camming surface defining the path of rotational motion of said fastening member; and, (b) said fastening member includes a cam surface following member for rotating said fastening member and maintaining said fastening member in the indicated rotational orientation along the path of travel between the stowed and wearing positions.

* * * * *